(12) United States Patent
MacDougall

(10) Patent No.: US 9,550,686 B2
(45) Date of Patent: Jan. 24, 2017

(54) GREASE INTERCEPTOR FOR A WASTE WATER STREAM FROM AN EXHAUST FAN ASSEMBLY

(76) Inventor: James MacDougall, Victoria (CA)

(*) Notice: Subject to any disclaimer, the term of this patent is extended or adjusted under 35 U.S.C. 154(b) by 70 days.

(21) Appl. No.: 14/397,442

(22) PCT Filed: May 8, 2012

(86) PCT No.: PCT/IB2012/052269
§ 371 (c)(1),
(2), (4) Date: Oct. 27, 2014

(87) PCT Pub. No.: WO2013/167935
PCT Pub. Date: Nov. 14, 2013

(65) Prior Publication Data
US 2015/0076057 A1    Mar. 19, 2015

(51) Int. Cl.
| | | |
|---|---|---|
| *B08B 3/00* | (2006.01) |
| *C02F 1/40* | (2006.01) |
| *E03F 5/16* | (2006.01) |
| *F24F 13/22* | (2006.01) |
| *B01D 17/02* | (2006.01) |
| *C02F 101/32* | (2006.01) |
| *C02F 103/00* | (2006.01) |
| *C02F 103/32* | (2006.01) |

(52) U.S. Cl.
CPC ............. *C02F 1/40* (2013.01); *B01D 17/0214* (2013.01); *E03F 5/16* (2013.01); *F24F 13/222* (2013.01); *C02F 2101/32* (2013.01); *C02F 2103/001* (2013.01); *C02F 2103/32* (2013.01)

(58) Field of Classification Search
None
See application file for complete search history.

(56) References Cited

U.S. PATENT DOCUMENTS 6,824,696 B1 * 11/2004 Tolmie ............... B01D 17/0211
137/132
6,951,615 B2   10/2005 Tripodi et al.

FOREIGN PATENT DOCUMENTS

EP      1401770       2/2008
WO   WO2007/127612   11/2007

OTHER PUBLICATIONS

International Search Report for PCT/IB2012/052269 (mailed Jan. 17, 2013).

* cited by examiner

*Primary Examiner* — Eric Golightly
(74) *Attorney, Agent, or Firm* — Klarquist Sparkman, LLP

(57) ABSTRACT

To facilitate the collection of grease and water from commercial kitchen exhaust fans the invention provides a collection tank in communication with the drainage spout of the fan assembly. The tank has a lid for sealing the tank, a first reservoir for collecting the stream of grease and water and a second reservoir below the first reservoir for receiving water separated from the grease and water stream in the first reservoir. The first and second reservoirs are separated by a sloping plate. The tank also includes a siphoning apparatus which when connected to a source of high pressure fluid such as water or steam can purge the second reservoir of water and recycle the water back to a fan cleansing operation or to a disposal facility.

14 Claims, 21 Drawing Sheets

Typical installation of backshelf hood over cook line.

PRIOR ART

Hood and cealing enclosures

PRIOR ART

A Typical exhaust fan referred to as an up-blast fan assembly

PRIOR ART

Figure 4

*Schedule of Inspection for Grease Buildup*

| Type or Volume of Cooking | Inspection Frequency |
|---|---|
| Systems serving solid fuel cooking operations | Monthly |
| Systems serving high-volume cooking operations, such as 24-hour cooking, charbroiling, or wok cooking | Quarterly |
| Systems serving low-volume cooking operations | Semiannually |
| Systems serving low-volume cooking operations, such as churches, day camps, seasonal businesses, or senior centers | Annually |

PRIOR ART

GREASE INTERCEPTOR FOR A WASTE WATER STREAM FROM AN EXHAUST FAN ASSEMBLY

CROSS REFERENCE TO RELATED APPLICATIONS

This is the U.S. National Stage of International Application No. PCT/IB2012/052269, filed May 8, 2012, which was published in English under PCT Article 21(2).

TECHNICAL FIELD

The present invention relates generally to removal of organic contaminants from wastewater and in particular, to removal and collection of wastewater fats, oils, and grease from the waste water stream of commercial exhaust fans such as those found on the roof tops of large kitchen facilities.

BACKGROUND ART

A typical kitchen ventilation system includes an exhaust hood or canopy, ductwork, fan system, and a means of providing adequate make-up air. The entire system must constitute a fire-safe assembly within the building.

Exhaust hoods and canopies capture heat and contaminates in the air by means of filters, extraction baffles (cartridges), and water mist systems. There are many style variations of hoods with canopy styles-a large box with and open bottom-being the most common. Styles selection is based on the type of oven and the expected contaminates to be removed. Referring to FIG. 1, there is a drawing of one type of venting arrangement comprising a back shelf hood over a cook line. While there are several styles of hoods, all fall within two major categories:

Type I hoods carry a listing label and are manufactured and installed according to the manufacturer's and listing agencies' requirements. They are designed to handle grease and include a number of integrated components within the hood.

Type II hoods are used in the collection of steam, vapor, heat, and odors—but not grease. The two sub-classifications of Type II hoods are condensate and heat/fume.

Referring to FIG. 2, there is shown one example of an exhaust hood and associated duct work installed in a ceiling. The exhaust ductwork transfers contaminated air, cooking heat, and grease vapors from the hood to the exhaust fan. Exhaust ducting should have the following qualities:

Ducts that accumulate combustible grease should be constructed from 16-steel or 18-gage stainless steel as per code requirements.

Ducts must be securely supported by non-combustible duct bracing and supports designed to carry the gravity and seismic loads as per code requirements. No fasteners should penetrate the duct.

Duct enclosures made from materials such as of gypsum board, plaster, concrete, or ceramic tiles must be approved as a continuous fire-rated enclosure.

Referring to FIG. 3 there is shown a typical exhaust fan used for a commercial kitchen. Exhaust fans move the heat and contaminated air out of the building. All exhaust fan components must be accessible or have removable access panels for cleaning and inspection and must be designed to contain and drain any excess grease. There are three major types of exhaust fans:

Up-blast fans are typically aluminum centrifugal fans that are designed for roof mounting directly on top of the exhaust stack.

Utility fans are normally roof-mounted with the inlet and outlet 90 degrees from each other and are typically used where high-static pressure losses exist.

Inline fans are typically located in the interior duct and are used where exterior fan mounting is impractical.

Fire Code Requirements

As kitchen ventilation is used, grease laden vapors are carried through the entire system. This action deposits oil on all interior parts of the system which must be cleaned to reduce the risk of fire. The minimum frequency and standard for cleaning is provided by the National Fire Protection Association (NFPA) and fire codes NFPA96.

Cleaning ducting and fans also requires following these codes:

Restaurant NFPA Fire Code 96: 4.1.5

The responsibility for inspection, maintenance, and cleanliness of the ventilation control and fire protection of the commercial cooking operations shall be the ultimate responsibility of the owner of the system provided that this responsibility has not been transferred in written form to a management company or other party.

Fan Access Panel NFPA Fire Code 96: 8.1.5.3.1

Up-blast fans shall be supplied with an access opening of a minimum 76 mm by 127 mm (3 in. by 5 in.) or a circular diameter of 101 mm (4 in.) on the curvature of the outer fan housing to allow for cleaning and inspection of the fan blades.

Electrical Wiring/Fan Hinge NFPA Fire Code 96: 7.8.2.1

Rooftop terminations shall be arranged with or provided with the following: (8) a hinged up-blast fan supplied with flexible weatherproof electrical cable and service hold-open retainer to permit inspection and cleaning that is listed for commercial cooking equipment.

NFPA Fire Code 96: 8.1.1.1

Approved up-blast fans with motors surrounded by the airstream shall be hinged, supplied with flexible weatherproof electrical cable and service hold-open retainers, and listed for this use.

NFPA Fire Code 96: 9.2.1

Wiring systems of any type shall not be installed in ducts.

Rooftop Grease Containment NFPA Fire Code 96: 7.8.2.1

Rooftop termination shall be arranged with or provided with the following: (4) The ability to drain grease out of any traps or low points formed in the fan or duct near the termination of the system into a collection container that is noncombustible, closed, rainproof, and structurally sound for the service to which it is applied and that will not sustain combustion. (5) A grease collection device that is applied to exhaust systems that does not inhibit the performance of any fan.

NFPA Fire Code 96: 8.1.1.3

Up-blast fans shall have a drain directed to a readily accessible and visible grease receptacle not to exceed 3.8 L (1 gal).

Inspection & Cleaning Frequency NFPA Fire Code 96: 11.4, 11.6.1, 11.6.2

The entire exhaust system shall be inspected for grease buildup by a properly trained, qualified, and certified company or person(s) acceptable to the authority having jurisdiction and in accordance with Table 11.4. [See FIG. 4]. Upon inspection, if the exhaust system is found to be contaminated with deposits from grease-laden vapors, the contaminated portions of the exhaust system shall be cleaned by a properly trained, qualified, and certified company or person(s) acceptable to the authority having jurisdiction. Hoods, grease removal devices, fans, ducts, and other appurtenances shall be cleaned to remove combustible contaminants prior to surfaces becoming heavily contaminated with grease or oily sludge.

Kitchen Ventilation Cleaning Process

The kitchen Ventilation cleaning process can be broken into 5 stages:

Cleaning of Filters
Bagging the Hood
Exhaust fan cleaning
Fans Grease receptacle
Ducting and Hood
Cleaning of Filters The kitchen exhaust cleaning personnel first remove and clean the filters from the hood, this cleaning is usually done by means of applying a degreaser and washing with high pressure steam over a containment tank to capture all waste generated. This process is complete once all built up oil and grease in no longer present on the visible surfaces.

Bagging the Hood

Once the hoods filters are removed, the cleaning personnel begin what is called the bagging process. Using plastic, tape and clamps, the kitchen hood is surrounded with plastic in a manner to capture all wash water. This is then to be collected and funneled into a collection container and not to fall on the floor or ground.

Exhaust Fan Cleaning

Once the hood is bagged, the cleaning personnel begin the cleaning process of the exhaust fan on the roof. This includes spraying chemical degreasers and high pressure steam onto the interior parts of the fan. During this process all wash water injected into and onto the fans parts is expelled through the precipitation drain and onto the roof and eventually into the storm drain connecting to the roof top. This cleaning process merely displaces the grease from the fan to the roof drain and causes pollution. This task is complete once all built up of oil and grease in no longer present on the visible surfaces.

Fans Grease Receptacle

The grease receptacle must be emptied of oil and grease and or the filters must be changed. Typically this unit is mounted to the fan to collect the oil that drips from the fan during operation. Rain water must also pass this system so grease is easily carried away and onto the roof. A typical capturing design is a collection box that fails its intended function. This is because once full of rain water, the oil floats to the top and spills onto the roof. This grease receptacle can also contain filter media to hold onto the grease and prevent escape; unfortunately this media most often does not get changed due to its unavailability or its inability to perform its deigned function. The result is the hazardous condition depicted in the photograph in FIG. 5.

Ducting and Hood

Once the fan is cleaned, chemical degreasers and high pressure steam are sprayed into the ducting below the fan leading down from the roof and towards the kitchen below. In most cases access doors can be found that supply additional cleaning points for further cleaning. This wash water and chemical flows towards the hood and is then directed by the tarp into the collection container. Once the ducting is cleaned the hood is washed by the same manor of steam and chemicals. All waste water is then disposed of according to the local sewer use bylaw.

The Exhaust Fan Drain Spout

Referring back to FIG. 3, there is shown one example of an exhaust fan. Since the first edition of NFPA96 in 1961 exhaust fan design has improved in order to meet rigid fire safety requirements. Thanks to the adoption of these codes by local fire departments across North America there have been dramatic improvements in fire safety. Prior to the enforcement of these codes, fans would discharge oil directly and uncontrollably from multiple drain points directly onto the roof. As restaurants upgraded over the years to conform to the NFPA standards, exhaust fans have become more reliable and waste discharge points have been focused to one spout.

Through this spout, rainwater that falls into the interior of the fan is permitted to escape.

Without the spout, water would build up inside the fan and eventually spill into the interior of the building.

This spout also permits excess oil to be released from the fan

Exhaust Fan Grease Discharge

Still referring to FIG. 3, exhaust fans are welded to their base; these fans rarely leak or drain from any place other than the spouts. However, exhaust fans have a silicon seal around the bottom and these seals typically begin to leak within one year of installation. The only way to properly reseal these leaks is by an adhesive. Silicon will break down under oily conditions.

Another common problem with a silicon seal is that the exhaust fan cleaning process tends to remove any silicon and makes replacement necessary. An adhesive will withstand both the properties of operating and cleaning.

Environmental Requirements

The kitchen exhaust fan has proven to be the most difficult to manage both during operation and maintenance. Oil can be observed leaking from the fan during the cooking operation and rain provides the transportation it needs to be carried to the roof and drain. This event is both harmful for the roof and the environment.

When servicing the exhaust fan, a typical service company will use high pressure steam, water and chemicals. These methods are used to break down the oil and grease from exhaust fan.

Grease and chemicals can be observed discharging from the drain spout during the cleaning process. Costly truck mounted vacuums or effective onsite improvisation is needed to avoid this infraction.

Therefore, considering the above shortcomings, there is still a requirement for a device that will capture contaminated water waste and grease operation and maintenance and eliminate the pollution caused by cleaning and operation of exhaust fans. There is also a requirement for a device that will help restaurants and cleaning personnel to meet stringent fire codes and anti-pollution codes.

DETAILED DESCRIPTION

One object of the present invention is to meet NFPA 96 requirements.

Another object of the invention is to protect the roofs of kitchen buildings from grease and oil spillage.

Yet another object of the invention is to provide adequate grease capture capacity.

A further object of the invention is to fit all commercial exhaust fan systems.

Still another object of the invention is to provide an economical solution in the marketplace.

One advantage of the present invention is that it requires far less maintenance than known technology.

A second advantage of the present invention is that it can be coupled to a treatment process such as biotechnology cleansing process resulting in an effluent which places significantly less stress on both public and private sewer systems.

Yet another advantage of the invention is that grease and oil can be collected and then used in the manufacture of biodiesel.

Yet another advantage is the cost savings to both public and private entities that result from such cleaner effluent.

Still a further advantage of the invention is that there is no mechanical process involved in collecting the waste water stream.

Other features and advantages of the present invention will be apparent from the following more detailed description of the preferred embodiments, taken in conjunction with the accompanying drawings which illustrate, by way of example, the principles of the invention.

DESCRIPTION OF DRAWINGS

FIG. 4 illustrates a typical inspection schedule for grease buildup.

Referring now to FIG. 6 there is shown a typical installation of an exhaust fan assembly 2 on a roof 30. The exhaust fan assembly 2 may be on the roof of a restaurant or other commercial kitchen facility. The exhaust fan assembly 2 comprises a housing 28 for housing the exhaust end of the ventilation ducting 16 coming up from a stove or an oven. The ducting housing 28 is fixed to the roof by support members 26 and 18. On top of the duct housing 28 is installed the fan and motor assembly 29. The fan and motor assembly 29 comprises an electric motor 8, a belt drive 6 to connect the motor to a fan drive shaft 7 and a fan belt tension adjuster 4. Drive shaft 7 is connected to a set of fan blades to create suction within the ducting and blow the exhaust out the exhaust cowling 32 which encircles the fan and motor housing 34. Cooling vent 10 provides cooling air to the electric motor 8. The fan and motor housing 34 is hinged 14 to the duct housing 28 for access to the upper reaches of the duct 16 for cleansing and servicing. A drain spout 22 is provided to drain rain water that falls into the interior of the fan housing and to prevent a buildup of water within the fan housing that would eventually spill into the interior of the building. The water that flows through the drain spout is highly contaminated with fats, oils and grease. The drain spout drains into a grease containment tray 24 which is often prone to overflowing onto the surface of the roof 30 as illustrated in the photograph of FIG. 5.

Referring now to FIG. 7 there is shown the same exhaust fan assembly 2 of FIG. 6 indicating the path of exhaust air 40 from the duct 16 through the exhaust cowling 32 and into the atmosphere.

Referring now to FIG. 8 there is shown the same exhaust fan assembly 2 roof top installation indicating pathways 42 of rainwater and wash water/chemical mixtures into the fan and motor assembly 29. Furthermore, fan blade 12 when rotating at very high speeds drives grease-laden moisture 44 into the spout 22 where it drains 46 into grease containment tray 24.

Figure 1:
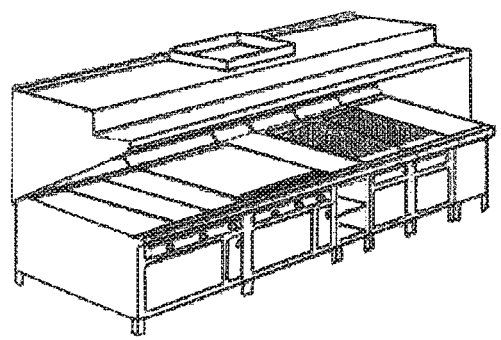
FIG. 1 illustrates a typical installation of a back shelf ventilation hood over a cook line.
Figure 2:
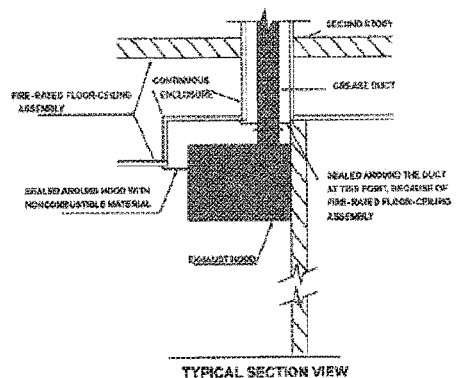
FIG. 2 illustrates a typical hood and ceiling enclosure.
Figure 3:
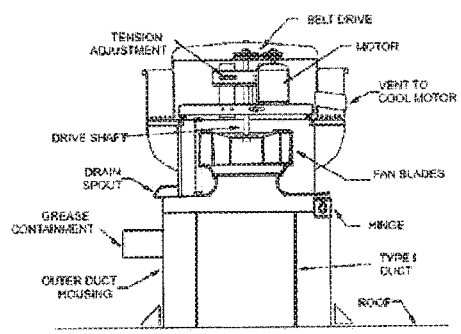
FIG. 3 illustrates a typical roof top ventilation fan.
Figure 5:
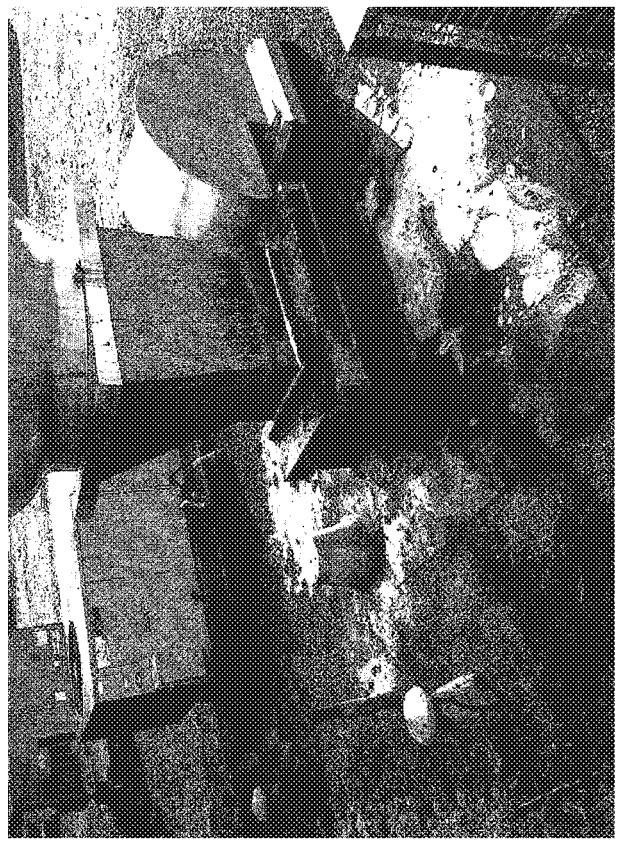
FIG. 5 illustrates a damaged and polluted roof from grease leakage.
Figure 6:
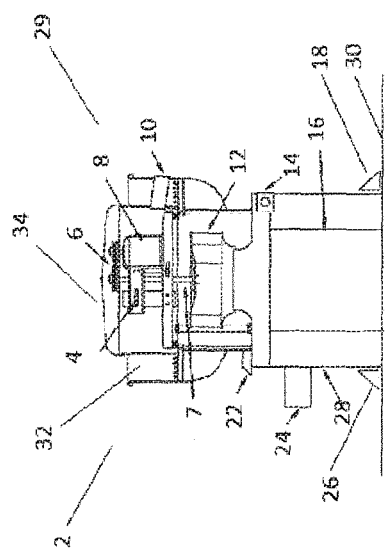
FIG. 6 illustrates a second embodiment of a roof installed exhaust fan assembly.
Figure 7:
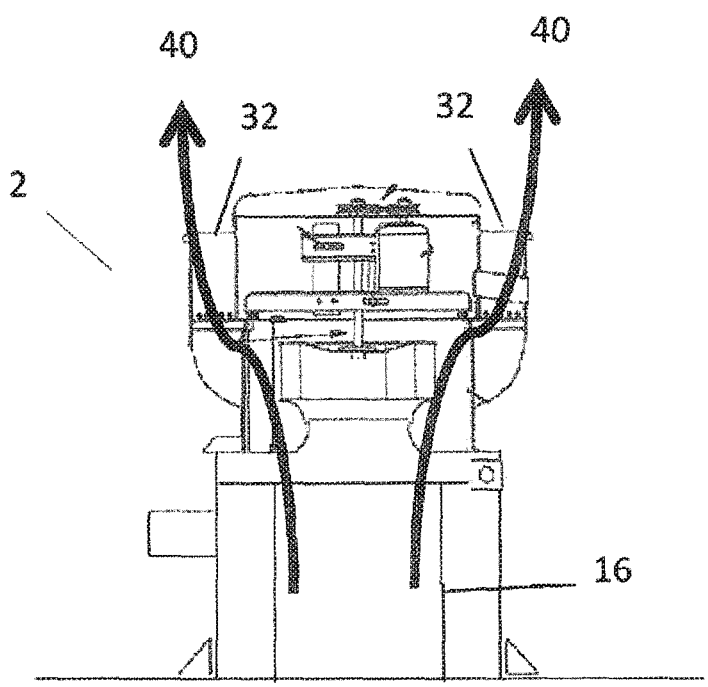
FIG. 7 illustrates the same exhaust fan assembly of FIG. 6 showing exhaust air flow.
Figure 8:
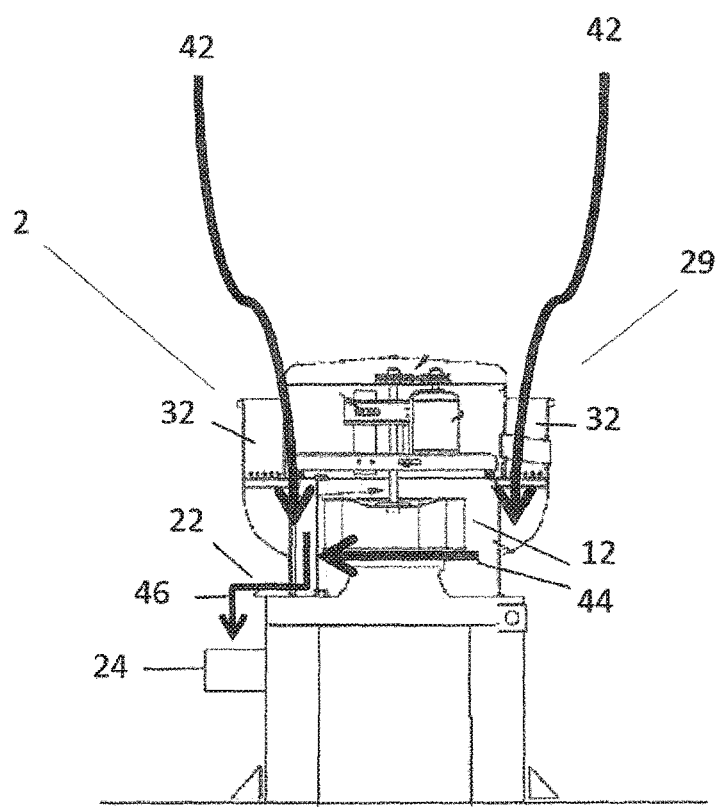
FIG. 8 illustrates the same exhaust fan assembly of FIGS. 6 and 7 showing water drainage flow.

Still referring to FIG. 8 and to FIG. 5, it can be seen that failure to properly clean the ducting and exhaust fan assembly 2, blockage of the drainage spout 22 or over flowing of the grease collection tray 24 will result in significant spillage, environmental liability and damage to the roof. Therefore there is a requirement to provide for a waste collection device that prevents these spills and provides for a clean and cost effective way to maintain the exhaust fan and housing assembly.

Figure 9:
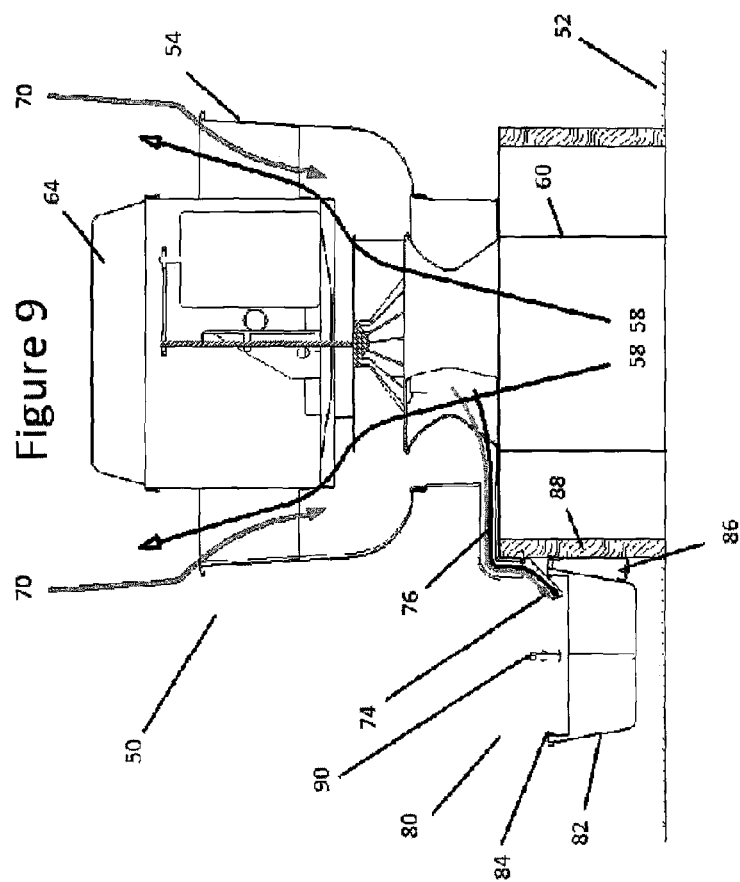
FIG. 9 illustrates one embodiment of the invention installed on an exhaust fan assembly.

Referring now to FIG. 9 there is shown one embodiment of the invention 80 in operation with fan assembly and ducting installation 50 installed on roof 52. The exhaust cowling 54 and the motor fan housing 64 are mounted to duct housing 56. Exhaust pathways 58 are shown from ducting 60 through exhaust cowling 54. Rainwater and wash water pathways 70 are shown draining 74 through drain spout 76 into the invention 80. This embodiment of the invention 80, shown in cross-section, comprises a collection tank 82, a tank cover plate 84, a wall mounting bracket 86 for mounting the collection 82 to a side wall 88 of the duct housing 56 and a piping assembly 90 the operation of which is more fully explained below.

Figure 10:
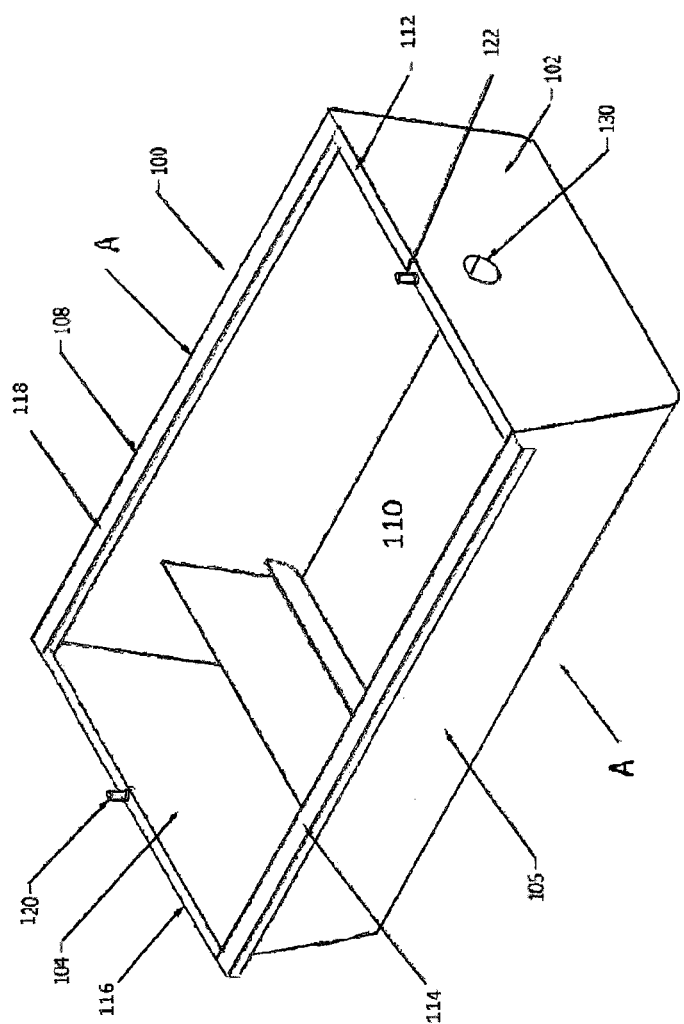
FIG. 10 is a perspective view of one embodiment of the containment tank of the invention.

Referring now to FIG. 10 there is shown a containment tank 100 of one embodiment of the invention from a right-hand top perspective. The containment tank 100 is manufactured from '16 gauge 316 stainless steel'. The containment tank 100 comprises a right hand wall 102, a left hand wall 104, a front wall 106, a rear wall 108 and a bottom 110. The tops of the walls 102 to 108 each have a lip 112 to 118 to permit sealing placement of a cover plate (described below) using bolts 120 and 122 and a suitable nut such as a butterfly nut. The right hand wall 102 includes an aperture 130 which connects the containment tank a piping assembly more fully explained below.

Figure 11:
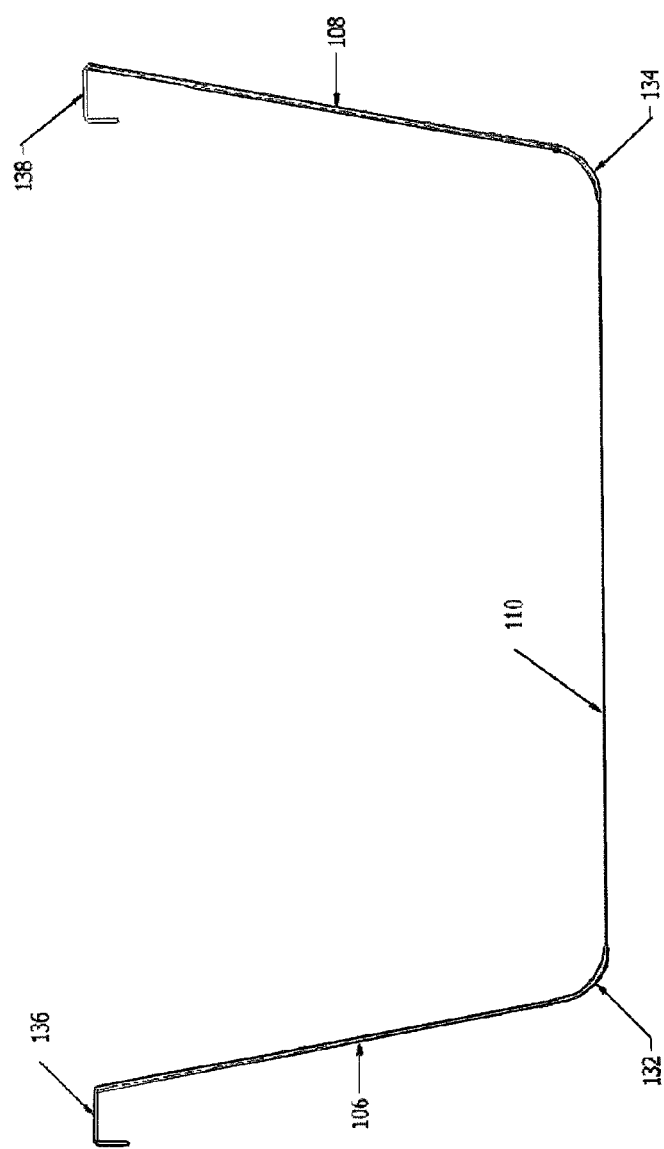
FIG. 11 is a cross-sectional side view of the tank of FIG. 10.

Referring now to FIG. 11 there is shown the containment tank 100 of FIG. 10 in cross-sectional view through section A-A in FIG. 10. The front surface 106, the back surface 108 and the bottom surface 110 are formed from a single piece of 316 stainless steel and bent so that the corners 132 and 134 are rounded. The front wall lip 136 projects outwards from the containment tank and the rear wall lip 138 projects inwards into the containment tank. The back wall 108 mounts adjacent to the duct housing containment wall 88 and projecting the lip 138 inwards prevents interference with the installation of the containment tank against the duct housing wall.

Figure 12:
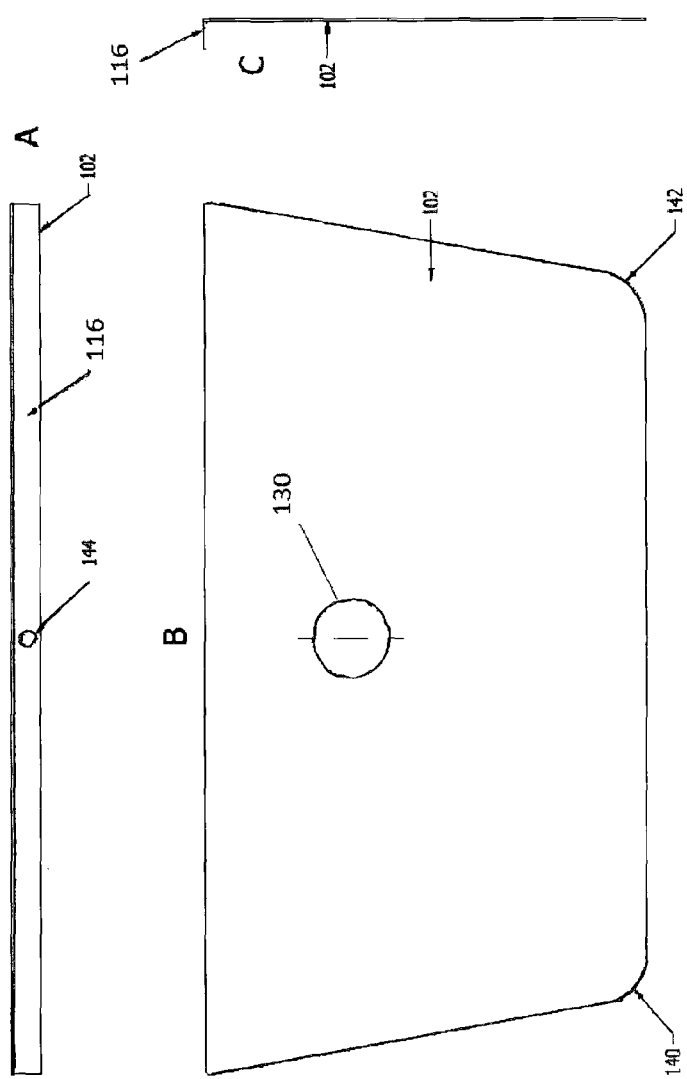
FIG. 12A is a top view of the right hand wall of the containment tank of FIG. 10.
FIG. 12B is a front view of the right hand wall of the containment tank of FIG.
FIG. 12C is a side view of the right hand wall of the containment tank of FIG. 10.

Referring now to FIGS. 12A, B and C there is shown in FIG. 12A a top view of right hand wall 102, in FIG. 12B a front view of right hand wall 102 and in FIG. 12C a side view of right hand wall 102. The right hand wall 102 is manufactured from a single piece of 16 gauge 316 stainless steel. The front view shows the location of aperture 130. Corners 140 and 142 are cut to fit corners 132 and 134 respectively of tank 100. FIG. 12A shows the top lip 116 of wall 102 having aperture 144 to accommodate bolt 122 as shown in FIG. 10. FIG. 12C shows the wall in side view with lip 116 projecting into the containment tank. Wall 102 is fixed in place to the right hand side of the containment tank using suitable fixing means such as welding.

Figure 13:
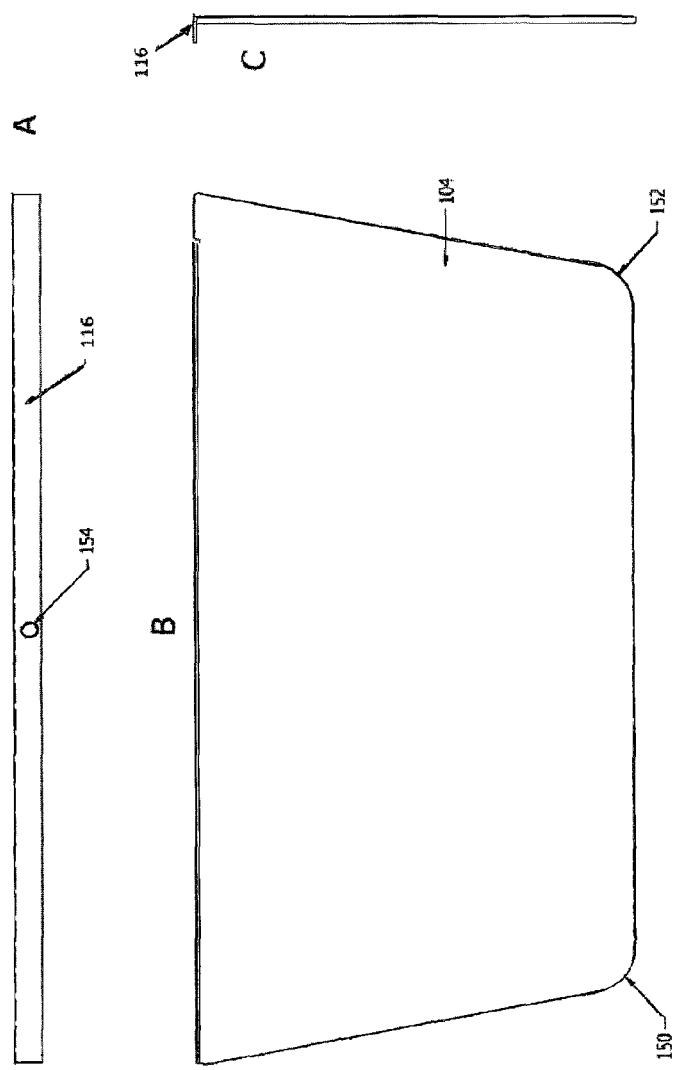
FIG. 13A is a top view of the left hand wall of the containment tank of FIG. 10.
FIG. 13B is a front view of the left hand wall of the containment tank of FIG. 10.
FIG. 13C is a side view of the left hand wall of the containment tank of FIG. 10.

Referring now to FIGS. 13A, B and C there is shown in FIG. 13A a top view of left hand wall 104. FIG. 13B shows a front view of the left hand wall 104 and FIG. 13C shows a side view of left hand wall 104 of the containment tank 100. The corners 150 and 152 of wall 104 are contoured to fit the left hand side of the containment tank 100 corners 132 and 134 respectively. The top view in FIG. 13A illustrates the lip 114 projecting into the tank 100 and the bolt aperture 154 which is used to accommodate bolt 120. The side view of FIG. 13C shows lip 114 in side view.

Figure 14:
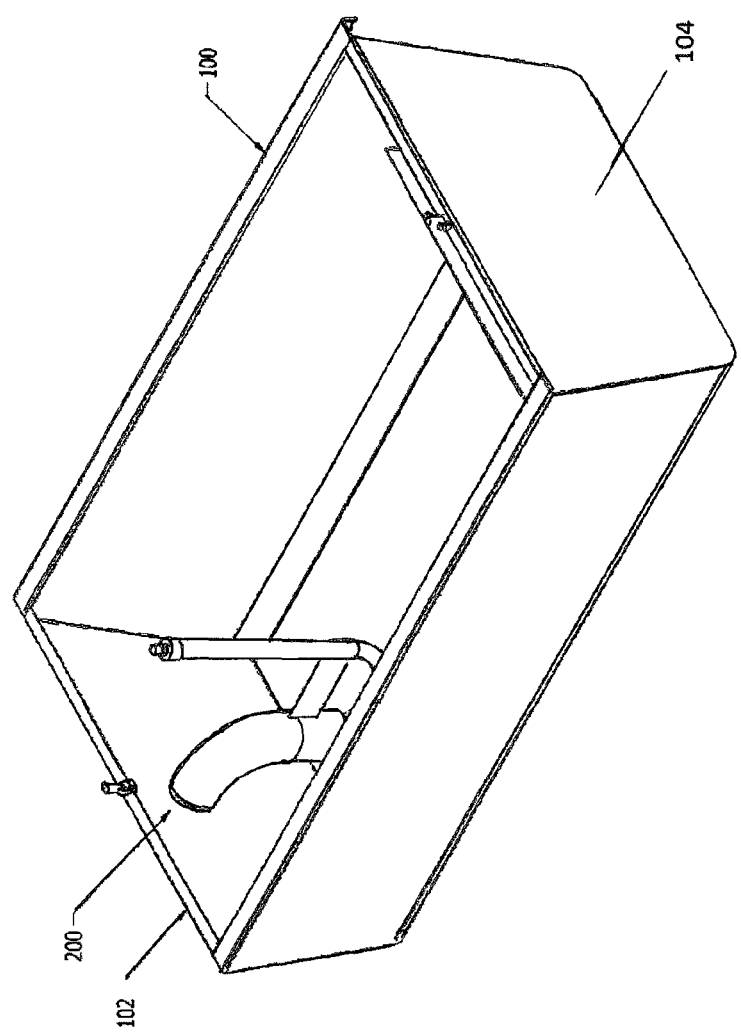
FIG. 14 is a top perspective view of the containment tank of FIG. 10 and the piping assembly.

Referring now to FIG. 14 there is illustrated containment tank 100 in a left hand wall 104 top perspective view. Piping assembly 200 is installed within the tank 100. The piping assembly 200 is connected to the containment tank by way of aperture 130 in right hand wall 102.

Figure 15:
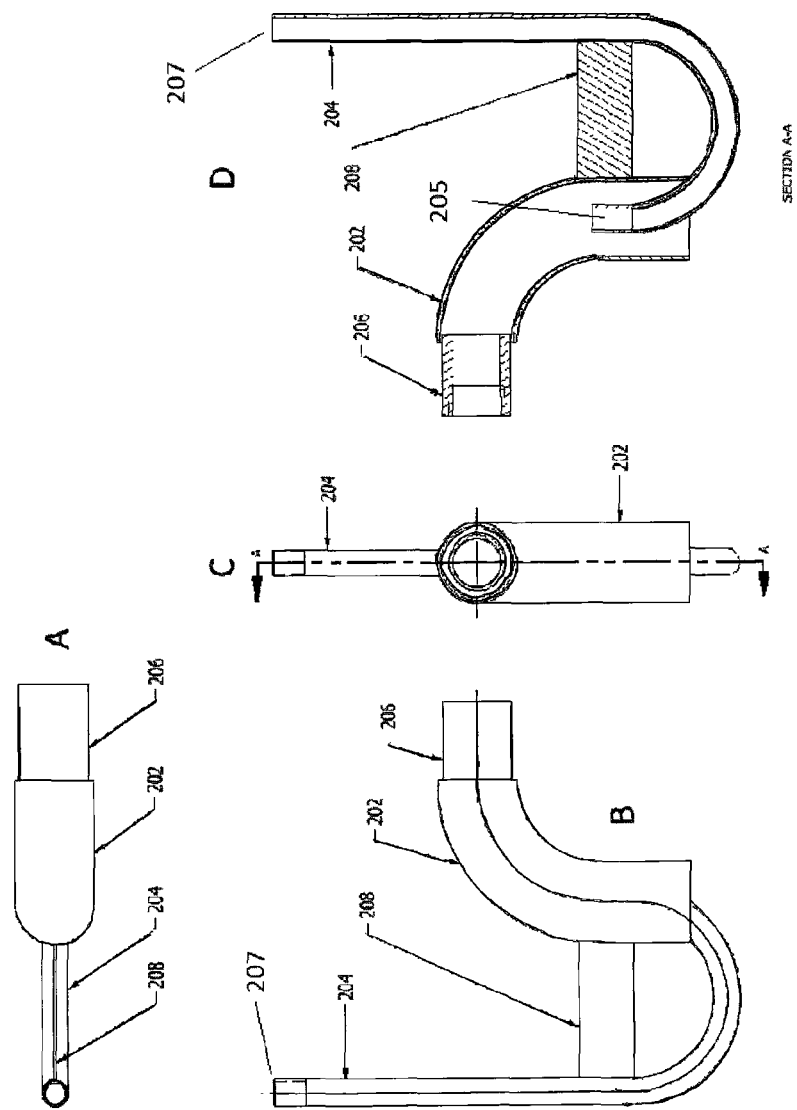
FIG. 15A is a top view of the piping assembly.
FIG. 15B is a side view of the piping assembly.
FIG. 15C is a front view of the piping assembly.
FIG. 15D is a cross-sectional side view of the piping assembly.

Referring now to FIGS. 15A to D there is shown the piping assembly 200 in top view in FIG. 15A, in side view in FIG. 15B, in front view in FIG. 15C and in cross-sectional side view in FIG. 15D.

Referring to FIG. 15B, the piping assembly comprises a piping elbow 202, a 'J'-shaped venturi pipe 204, a connector 206 which is inserted into aperture 130 in right hand wall 102 and a stiffening member 208. The first end 205 of the venture pipe 204 is located within the elbow 202 and the second end 207 of the venture pipe 204 is open to atmosphere above the tank lid and outside of the tank. The operation of the piping assembly is more fully explained below.

Figure 16:
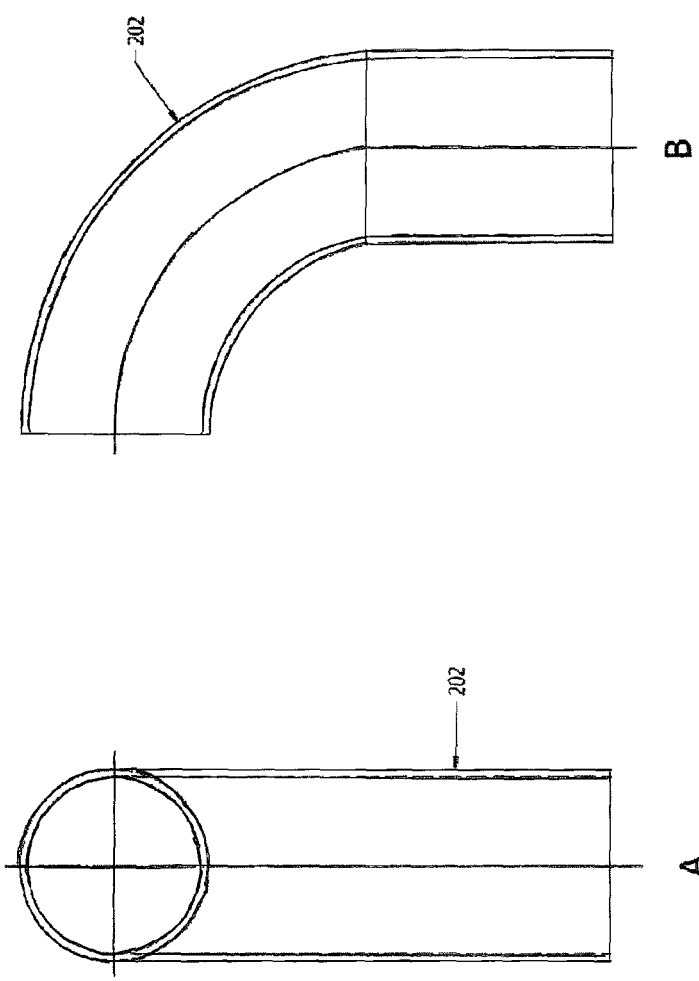
FIG. 16A is a front view of the elbow of the piping assembly.
FIG. 16B is a side view of the elbow of the piping assembly.

Referring now to FIGS. 16A and B there is shown in FIG. 16A a front view of elbow 202 and in FIG. 16B a side view of elbow 202. The elbow is manufactured from 16 gauge 316 stainless steel. In the embodiment shown the pipe is about 1.5 inch in diameter and forms a 90 degree elbow. The elbow has in inlet 201 and an outlet 203. The elbow is used to drain water from the tank 100 that will fill the tank 100 during the course of cleansing operations as more fully explained below.

Figure 17:
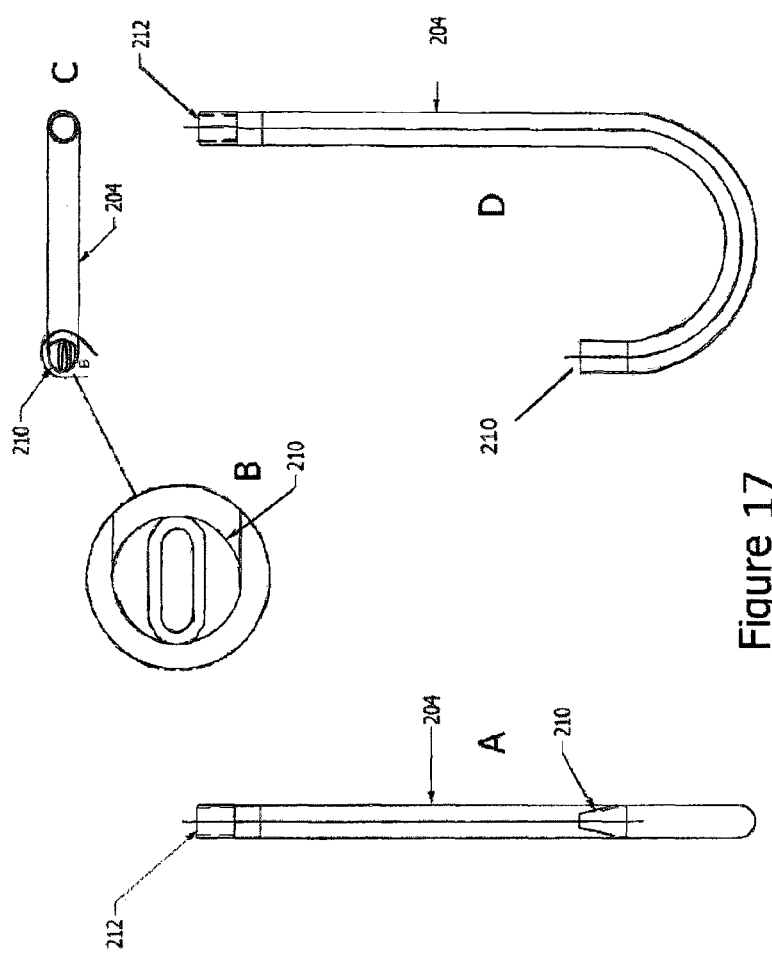
FIG. 17A is a front view of the T tube of the piping assembly.
FIG. 17B is a top enhanced view of the lower tip of the 'J' tube of the piping assembly.
FIG. 17C is a top view of the 'J' tube of the piping assembly.
FIG. 17D is a side view of the 'J' of the piping assembly.

Referring now to FIGS. 17A to D there is shown in FIG. 17A a front view of one embodiment of the venture pipe 204. FIG. 17D shows a side view of the venture pipe and FIG. 17C shows a top view of the venturi pipe 204. A detailed view of pipe end 210 is shown in FIG. 17B. The venturi pipe 204 is a 'J'-shaped pipe having a higher end 212 and a lower end 210. End 212 penetrates the top lid of the tank as more fully explained below and is exposed to atmospheric pressure whereas end 210 is tapered so as to create a venturi tube. The venturi pipe 204 acts with elbow 202 to siphon water from the containment tank second reservoir either in a recirculating mode during cleaning and degreasing of the fan and ducting; or, in a draining mode to drain the containment tank to a mobile disposal unit.

Figure 18:
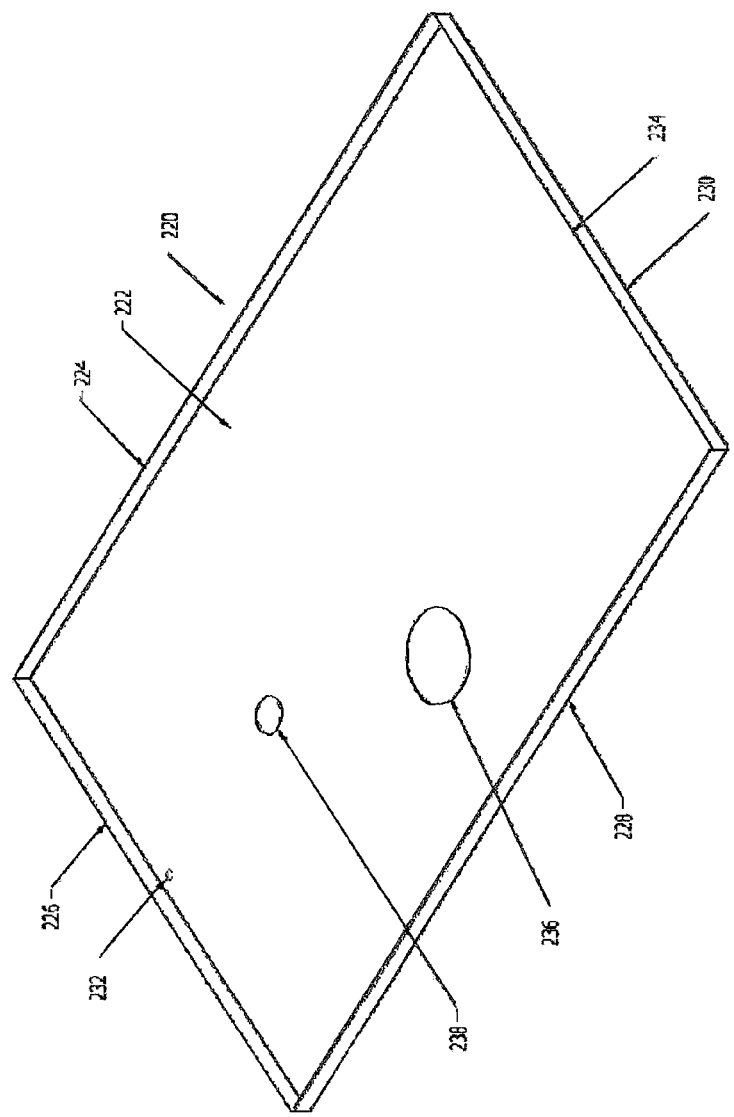
FIG. 18 is a top perspective view of an embodiment of the lid of the invention.

Referring to FIG. 18 there is shown one embodiment of the lid 220 for placement over the top of the containment tank 100. The lid 220 comprises a flat stainless steel panel 222 surrounded by upwardly disposed edges on each side 224 to 230. The lid 220 is fastened to the top of the containment tank 100 by bolts 120 and 122 as shown in FIG. 10 which are placed through lid apertures 232 and 234 in FIG. 18. A suitable nut such as a butterfly nut can be used to tighten the lid onto the surface of the container. Aperture 236 is a drain aperture and is used to drain fluids that drip from the fan housing during operation as a result of rain or to drain cleaning and degreasing fluids during servicing onto the top of the lid and into the container. Aperture 238 permits end 207 of the venturi pipe 204 to have access to atmospheric pressure.

Figure 19:
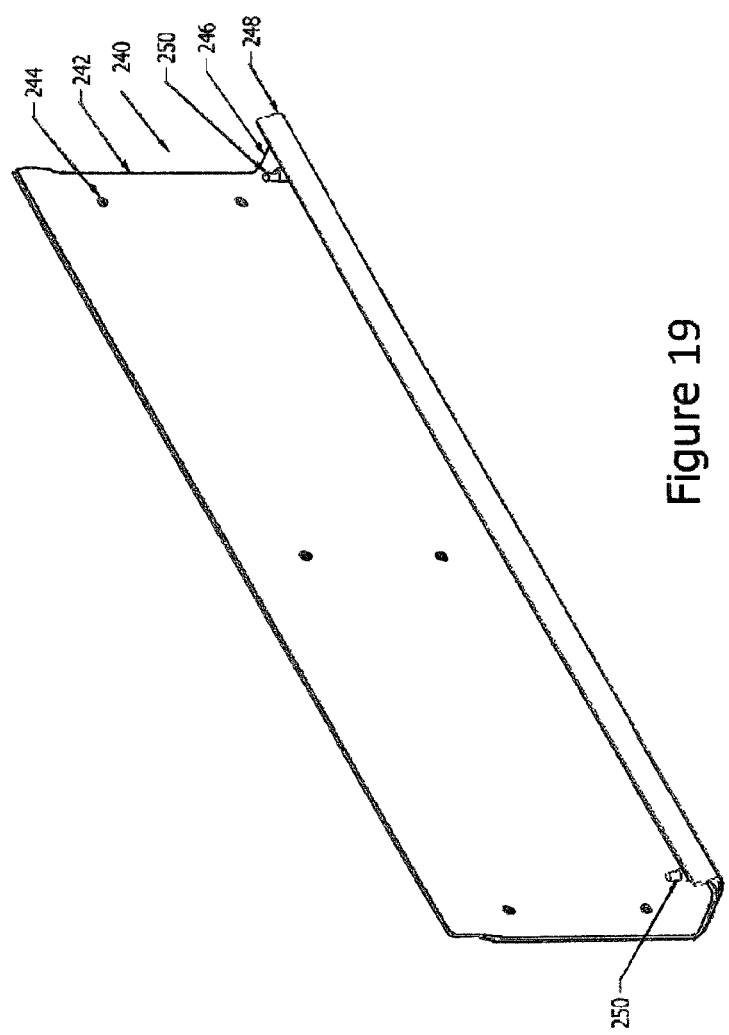
FIG. 19 is a side perspective view of an embodiment of the mounting bracket of the invention.

Referring now to FIG. 19 there is shown a perspective view of one embodiment of the wall mount assembly 240 used to mount the containment tank 100 to the sidewall of the duct housing 88 as illustrated in FIG. 9. The wall mount assembly 240 comprises a wall mount bracket 242 having a plurality of apertures 244 for mounting to the side wall 88 of the duct housing 56. The profile of the bracket 240 is 'L' shaped. Fixed to the bottom leg 246 of the wall mount bracket is an adjusting bracket 248. The adjusting bracket relies upon nut and bolt assemblies 250 for fixing to the wall mount bracket 240. The wall mount assembly ensures the top surface of the tank remain horizontal.

Figure 20:
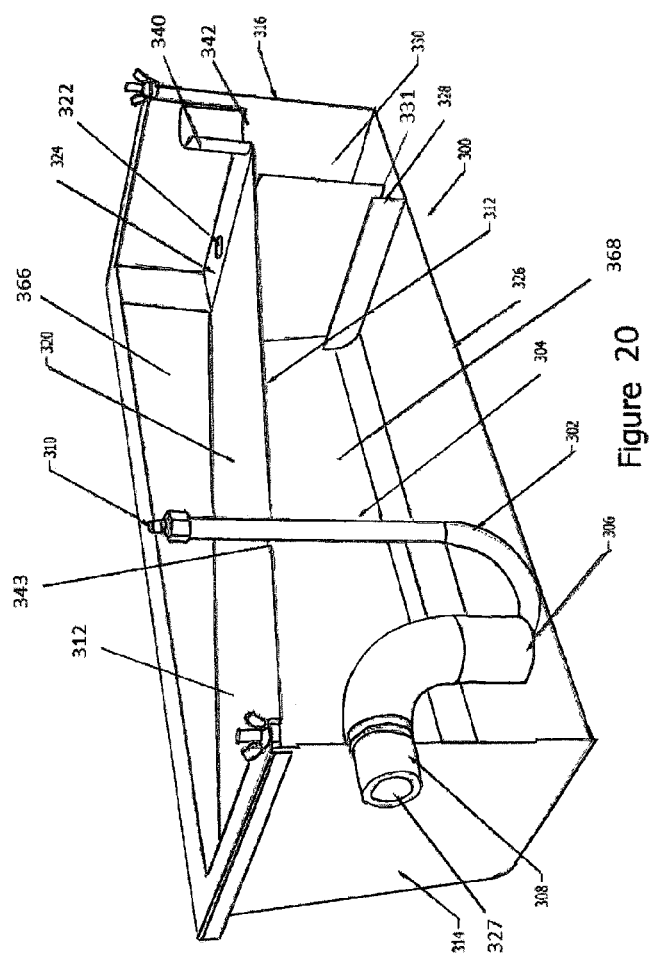
FIG. 20 is a side cross-sectional perspective view of the assembled containment tank of one embodiment of the invention.

Referring now to FIG. 20 there is shown another embodiment of the containment tank 300 with internal structures. The horizontal lid is removed. The containment tank 300 comprises a first upper reservoir 366 and a second lower reservoir 368 separated by sloping plate 312. The plate 312 has a sloped portion 320 and a horizontal portion 324. The plate 312 has at least three apertures. Aperture 343 permits the end 310 of the venture tube 304 to penetrate the plate 312 and rise above the lid. Aperture 322 and aperture 342 surrounded by a standpipe 340 permits drainage of fluids from the top reservoir 366 to the bottom reservoir 368. Piping assembly 302 comprising venturi pipe 304 and elbow 306 are located in the lower reservoir 368 of the containment tank 300. The discharge end 327 of the elbow 306 penetrates wall 314 through aperture 308. On the bottom inside surface 326 of containment tank 300 is an upwardly projecting baffle member 328 extending across the width of the tank. Depending down from the sloped section 320 of plate 312 is a second baffle 330. The bottom 331 of the second baffle is above the surface 326 of the tank 300 thereby permitting water to move from bottom reservoir section 330 to the main section 326.

Figure 21:
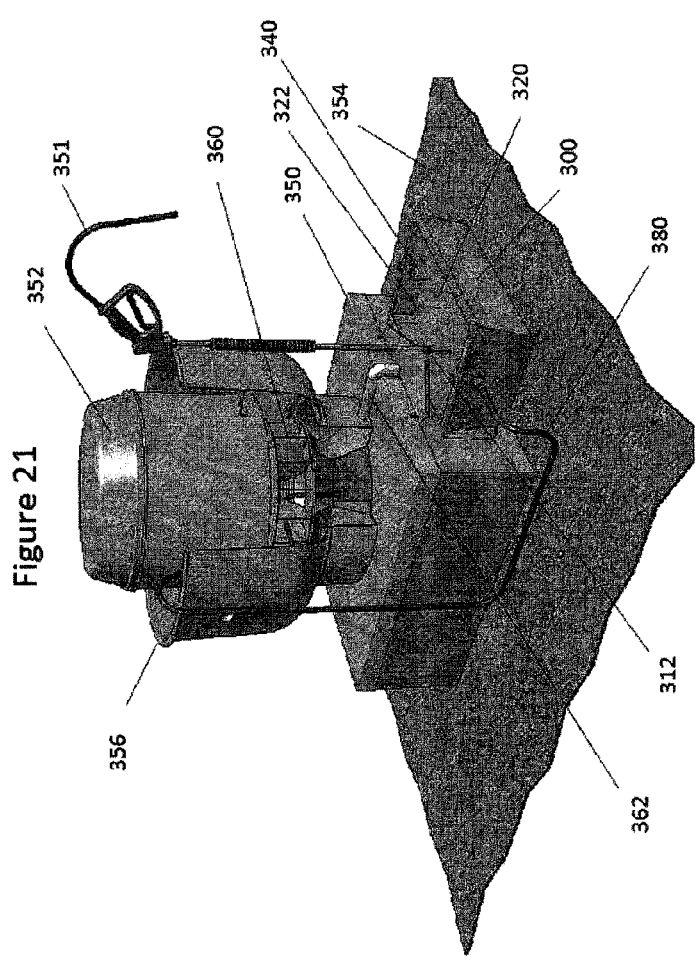
FIG. 21 is a view of the invention in operation with a fan and duct assembly mounted to a roof top.

Still referring to FIG. 20 and also to FIG. 21 the operation of the invention is explained. FIG. 21 shows the duct housing 350 and the motor fan housing 352 mounted to a roof 354. The exhaust outlet cowling 356 surrounds the fan and motor housing 352. During operation significant amounts of grease and dirt will accumulate on the inside surface of the cowling 356 and on the fan blades 360. Rain and moisture falling into the exhaust cowling will collect grease and dirt which will be drained off through the outlet 362 and into the containment tank 300. The top reservoir of the containment tank 366 is sealed from the bottom portion 368 by the inclined separation plate 320. The top reservoir 366 of the containment tank 300 has a capacity of about 1.3 gallons according to code and is intended to collect grease between scheduled cleanings of the fan assembly and the duct. The fluid draining into the top reservoir of the containment tank is an oil and grease/water mixture. The oil and grease will be floating on top of the water. As the fluid level in the upper reservoir 366 of the tank 300 rises, water will flow into the bottom reservoir 368 by way of aperture 322; however, stand pipe 340 will prohibit the oil from entering into the lower reservoir of the containment tank. If the fluid level in the upper reservoir of the containment tank is excessive then grease and oil will overflow into the standpipe 340 and into the bottom reservoir 368 by way of aperture 342 and into the sump portion 330 instead of overflowing the tank and falling onto the roof of the building 354.

During cleaning operations the exhaust cowling, the fan and motor housing and the fan blades will be thoroughly cleaned using high-pressure water, steam and degreasers. The contaminated solution will flow through outlet 362 into the tank top reservoir 366 and then into the bottom reservoir 368. Since oils and grease are dissolved in the run-off it is necessary to purge the containment tank of the contaminated cleaning run-off. The top portion of the separating plate will be cleaned by degreasers and steam and that run-off will flow into the lower reservoir. To cleanse and purge the containment tank 300 a high-pressure water source 351 is attached to the top end 312 of the venturi pipe 304. High pressure water is forced through the venturi 304 pipe and through the tapered opposite end of the venturi 370. The water is then expelled out of the containment tank by way of elbow 306 and into a recirculating hose 380. The high-pressure water flowing through the venturi nozzle 210 in FIG. 17 creates a syphoning effect inside of the elbow 306 which will draw all of the fluid in the lower reservoir 368 out and into the recirculating hose. When the cleaning is finished, the water can be directed to a waiting mobile containment tank for further treatment and disposal.

The invention is defined by the following claims.

The invention claimed is:

1. A grease interceptor for a wastewater stream from an exhaust fan assembly wherein said wastewater stream comprises a mixture of grease and water, said interceptor comprising:
  a. A tank comprising:
    i. An removable lid;
    ii. A first reservoir disposed beneath said removable lid and having an inlet in communication with a drainage spout from said exhaust fan assembly for receiving said mixture of grease and water and at least two outlets;
    iii. Wherein the mixture of grease and water drains by gravity;
    iv. Wherein said first reservoir has a first volume;
    v. A second reservoir in communication with said first reservoir by said at least two outlets;
    vi. Wherein said second reservoir has a second volume greater than said first volume;
    vii. Wherein the first reservoir is located above the second reservoir and separated from the second reservoir by;
  b. A separation plate; and
  c. A siphoning apparatus located within the second reservoir for evacuating water from the second tank.

2. The device of claim 1 wherein the siphoning apparatus comprises:
  a. An elbow having an inlet within the second reservoir and an outlet penetrating a wall of said tank; and
  A 'J'-shaped pipe having a first tip located outside of the tank and a second tip located within said elbow.

3. The device of claim 2 wherein said second tip of said 'J' shaped pipe is truncated into a nozzle.

4. The device of claim 3 wherein when a high pressure fluid source is connected to said first tip, and said second tip accelerates said high pressure fluid through the elbow thereby creating a siphoning effect inside of the elbow for draining the contents of the tank.

5. The device of claim 4 wherein a first outlet of said at least two outlets is a first aperture through said separation plate so that a water component of said mixture of grease and water can flow into the second reservoir and a grease component cannot.

6. The device of claim 5 wherein a second outlet of the at least two outlets is a second aperture surrounded by a standpipe having an opening disposed below said lid so that as the level of the mixture of grease and water rises in the first reservoir said grease component is allowed to flow through said standpipe into the second reservoir to prevent tank overflow.

7. The device of claim 5 wherein an inlet of the standpipe is below a level of the removable lid.

8. The device of claim 6 wherein the second reservoir comprises a sump disposed beneath the at least two apertures for receiving the grease and water mixture.

9. The device of claim 8 wherein said sump is separated from the second reservoir by:
  a. a first upward projecting baffle plate fixed to a bottom inside surface of the tank and extending a width of the tank; and
  b. a second downward projecting baffle plate fixed to a bottom surface of said separating plate and offset a horizontal distance from said first baffle plate and extending said with of the tank;
  so that said grease component is trapped in said sump and so that a flow path is created for the water component into the second reservoir adjacent to the sump.

10. The device of claim 9 wherein a height of the first baffle plate is substantially less than a height of the second baffle plate.

11. The device of claim 10 further including an adjustable wall mounting bracket for mounting the tank to a side wall of a duct housing and for maintaining the lid of the tank horizontal.

12. The device of claim 11 wherein the first reservoir has a capacity of at least 1.3 US gallons.

13. The device of claim 12 wherein the removable lid has:
a. four sides;
b. a raised edge along each of said four sides;
c. a first lid aperture to permit said first tip of the 'J' shaped-pipe to locate above the level of the removable lid for connection to a high pressure fluid source; and
a second aperture to permit waste water draining from a drainage spout depending from the exhaust fan into the first reservoir.

14. The device of claim 13 wherein the containment tank outlet is coupled to a biological treatment system so that the wastewater can be further processed prior to disposal.

* * * * *